United States Patent [19]

Trump

[11] 4,301,330

[45] Nov. 17, 1981

[54] LOUDSPEAKER PROTECTION CIRCUIT

[75] Inventor: Bruce Trump, St. Joseph, Mich.

[73] Assignee: Zenith Radio Corporation, Glenview, Ill.

[21] Appl. No.: 79,904

[22] Filed: Sep. 28, 1979

[51] Int. Cl.[3] .......................... H02H 3/20; H02H 7/20

[52] U.S. Cl. ................................ 179/1 A; 330/207 P

[58] Field of Search ............................ 330/207 P, 298; 179/1 A, 1 SW; 361/89, 94; 455/217, 223

[56] References Cited

U.S. PATENT DOCUMENTS

| | | | |
|---|---|---|---|
| 3,828,258 | 8/1974 | Hills et al. | 328/111 |
| 3,835,336 | 9/1974 | Block | 307/234 |
| 3,882,545 | 5/1975 | Titus | 360/137 |
| 3,959,735 | 5/1976 | Grosjean | 179/1 A |
| 3,965,295 | 6/1976 | Evans et al. | 179/1 A |
| 3,988,694 | 10/1976 | Yamazaki | 330/207 P |
| 4,034,268 | 7/1977 | Klauck | 330/207 P |
| 4,122,400 | 10/1978 | Medendorp et al. | 330/207 P |
| 4,122,507 | 10/1978 | Queen | 330/207 P |
| 4,127,743 | 11/1978 | Ozawa et al. | 330/298 |
| 4,173,740 | 11/1979 | Nagata et al. | 330/298 |

*Primary Examiner*—Bernard Konick
*Assistant Examiner*—Randall P. Myers
*Attorney, Agent, or Firm*—Thomas E. Hill

[57] ABSTRACT

A loudspeaker protection circuit senses an overload condition caused by an improper input signal or a fault within the amplifier by sensing a DC or infrasonic signal applied to the loudspeaker. The time between zero (axis) crossings of the amplifier output signal, which are related to the lower frequency components of the signal, are detected. If the period of time between zero crossings exceeds a predetermined time limit, the supply of the amplifier output signal to the loudspeaker is interrupted. In order to prevent false tripping of the circuit by normal conditions, the circuit only responds to signals exceeding a predetermined voltage level.

13 Claims, 3 Drawing Figures

LOUDSPEAKER PROTECTION CIRCUIT

BACKGROUND OF THE INVENTION

This invention relates to a loudspeaker protection circuit which interrupts the supply of the amplifier output signal to the loudspeaker when the circuit senses a condition leading to a potential loudspeaker failure caused by an improper input signal or a fault within the amplifier.

There are two principal conditions which can produce loudspeaker damage. The first of these is thermal overload caused by the application of excessive power to the loudspeaker for a sufficient period of time to cause the voice coil to burn out. The second of these is excursion overload caused by application of a signal of a frequency and amplitude to cause excessive motion of the speaker cone, thus producing physical damage. At low frequencies, excursion overload occurs at lower power input than is necessary for thermal overload.

There are a number of known techniques for protecting loudspeakers from one or both of these conditions. The simplest of these techniques is to incorporate a circuit breaker or fuse between the amplifier and the loudspeaker. This can provide a good measure of protection against thermal overload, but not for excursion overload, since lower power levels can also cause cone damage. In view of the fact that both frequency and power level are important, distinguishing a desirable signal from an undersirable signal on the basis of amplitude alone is not a viable technique.

Electronic circuits are known which sense the DC or low frequency signals applied to the loudspeaker and operate a protection circuit if they exceed a certain predetermined limit.

These circuits may utilize simple filters which remove the higher frequency components of the applied signal or more complex filters which have a subsonic cutoff frequency so that the circuit responds only to those frequencies which are very near DC. The relatively simple filter designs suffer from the disadvantage that they will respond to frequencies which are within the audio frequency spectrum, unless their cutoff frequency is made very low. A very low cutoff frequency creates a very slow response time to fault conditions which apply DC to the loudspeaker; typical response times for such filters being a half second or more, thus increasing the risk of damage. More complex filters can improve this response time but require more components which tends to decrease the reliability of the protection circuit.

OBJECTS AND SUMMARY OF THE INVENTION

An object of the present invention is to provide a loudspeaker protection circuit that provides a faster response to a fault condition or to improper input signals. Another object of the invention is to provide a loudspeaker protection circuit which is only responsive to subsonic frequencies without requiring complex analog filters. A further object of the present invention is to provide a protection circuit which utilizes relatively simple, low cost, and highly reliable circuitry.

These and other objects, advantages and features are achieved by a loudspeaker protection circuit in which a voltage detector is coupled to a loudspeaker for generating a control signal when the amplifier output signal crosses a predetermined threshold voltage. An interval timer coupled to the detector generates a disconnect signal when a time interval between selected control signals exceeds a predetermined time limit. A switch connected in circuit with the loudspeaker and the amplifier interrupts the supply of the amplifier output signal to the loudspeaker in response to the disconnect signal.

BRIEF DESCRIPTION OF THE DRAWINGS

FIG. 1 illustrates a typical output signal 10 from a power amplifier. Under normal conditions, this signal has an average output voltage of zero, that is, there is no DC present and the signal will periodically cross the zero volt axis. In the simple case where the signal 10 is a sine wave, these axis crossings will occur at the rate of twice the signal frequency. If significant low frequency components are present in the signal 10, then they will determine the elapsed time between the axis crossings.

A common failure mode for the power amplifier is the short circuiting of one of the output transistors resulting in the application of a large DC voltage at the output of the amplifier and thus across the loudspeaker. Under this condition the amplifier output signal will not cross the zero volt axis at all. In the presence of other conditions, the positive portion of the amplifier output signal, for example, will cross the zero volt axis at significantly greater time intervals.

Thus, by measuring the time elapsed between axis crossings of the amplifier output signal and by comparing this against a selected time interval corresponding to the time between axis crossings of a selected cutoff frequency, the presence of either condition which can cause loudspeaker damage can be detected. For example, if the cutoff frequency is chosen to be 10 Hz, a sine wave at this frequency would cross the zero volt axis every 50 milliseconds. Therefore, an amplifier output signal which does not cross the zero volt axis every 50 milliseconds indicates the presence of a condition which may cause loudspeaker damage and the supply of this signal to the loudspeaker would be interrupted. Thus, such potentially damaging conditions can be detected quickly and predictably.

Figure 1:
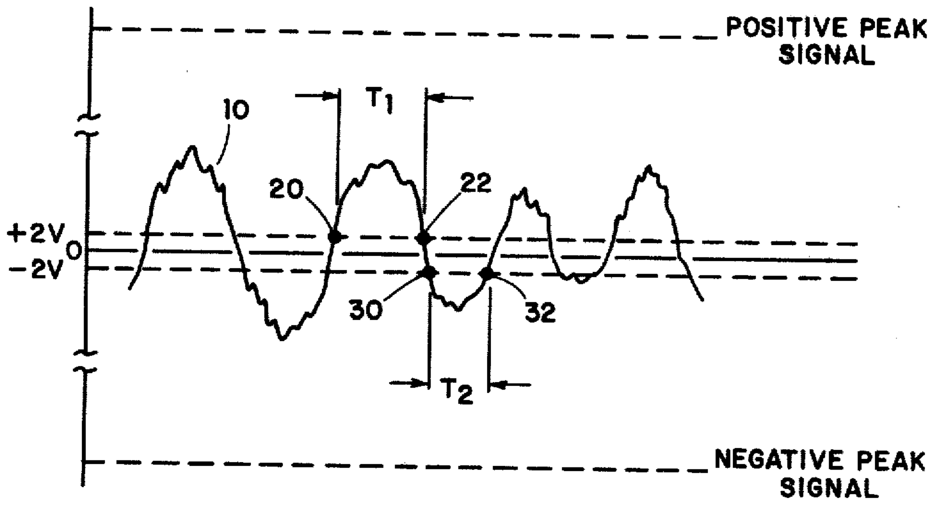
FIG. 1 illustrates a typical amplifier output signal voltage waveform.

As a practical matter however, a small DC voltage, typically 50 millivolts, will always be present in the amplifier output because of offsets in the difference amplifier and the finite gain in the feedback loop. In addition, low level infrasonic signal components may be present in a normal input signal as the result of such conditions as turntable rumble. Therefore, it is desirable that these signals not trip the loudspeaker protection circuit. Accordingly, a voltage threshold of 2 volts, for example, may be established to create a dead zone on either side of the zero volt axis and only the crossing of this threshold by the signal 10 utilized to detect the presence of a potentially damaging condition. Points 20 and 22 in FIG. 1 illustrate the crossing of the +2 V threshold.

Figure 2:
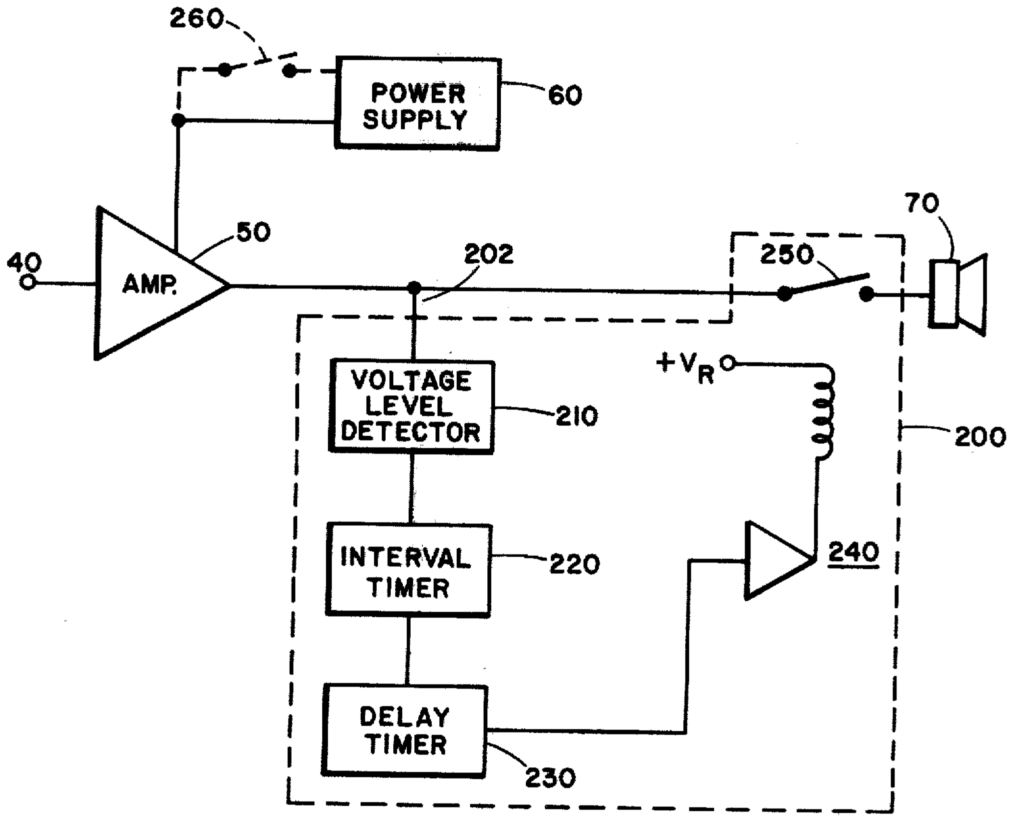
FIG. 2 is a block diagram of the present invention.

FIG. 2 illustrates, in block form, an amplifier system which incorporates an loudspeaker protection circuit 200 in accordance with the technique described above. A power amplifier 50 receives signals to be amplified from a suitable source (not shown) at an input terminal 40. The amplifier is connected to a source of operating potential 60 and has its output connected to a loudspeaker 70. Loudspeaker protection circuit 200 includes a voltage level detector 210 the input of which is coupled to the output of amplifier 50 via lead 202. The detector 210 generates a control signal when the amplifier output signal 10 crosses the selected plus or minus 2 volt threshold (FIG. 1). This control signal is coupled to the input of an interval timer 220 which determines the time duration between successive crossings of the threshold by the signal 10. If this time interval exceeds the selected 50 millisecond limit, the interval timer 220 generates a disconnect signal which is coupled to the input of delay timer 230. The output of the delay timer is coupled to the input of a disconnect circuit 240. Delay timer 230, when triggered by a disconnect signal, will actuate disconnect circuit 240 for a time equal to the duration of the disconnect signal plus a predetermined time delay. The disconnect circuit 240 actuates a switch 250 in series between the amplifier output and the loudspeaker 70 to disconnect the loudspeaker from the output of the amplifier and thus interrupt the supply of the amplifier output signal to the loudspeaker.

The delay timer 230 is not required to practice the present invention. However, its use offers two advantages. The time delay introduced by delay timer 230 may be 5 seconds, for example. This allows the amplifier time in which to stabilize after the problematic condition has been eliminated. In addition, if the condition is of short duration, this time delay will insure that the period of silence is sufficiently long to give the listener an audible indication of its presence.

A modification to the circuit shown in FIG. 2 is possible by having the disconnect circuit 240 actuate a switch 260, shown in broken lines on FIG. 2, which disconnects the power supply 60 from the amplifier 50 thus interrupting the supply of the amplifier output signal to the loudspeaker 70. This arrangement has the advantage of shutting off the amplifier when a potentially damaging condition occurs but suffers from the disadvantage that certain conditions, such as component failures, for example, will still exist when the delay timer 230 times out and reconnects the power supply to the amplifier. Thus, it is possible that an oscillatory condition in which the loudspeaker protection circuit 200 is constantly recycled will occur. The use of a latching relay would avoid this problem but the listener would be required to manually reset the protection circuit each time it tripped, which could create a nuisance. The oscillatory condition cannot occur with the embodiment in which the switch 250 is in a series between the output of the amplifier and the loudspeaker because the time delay does not start until the condition ceases.

Figure 3:
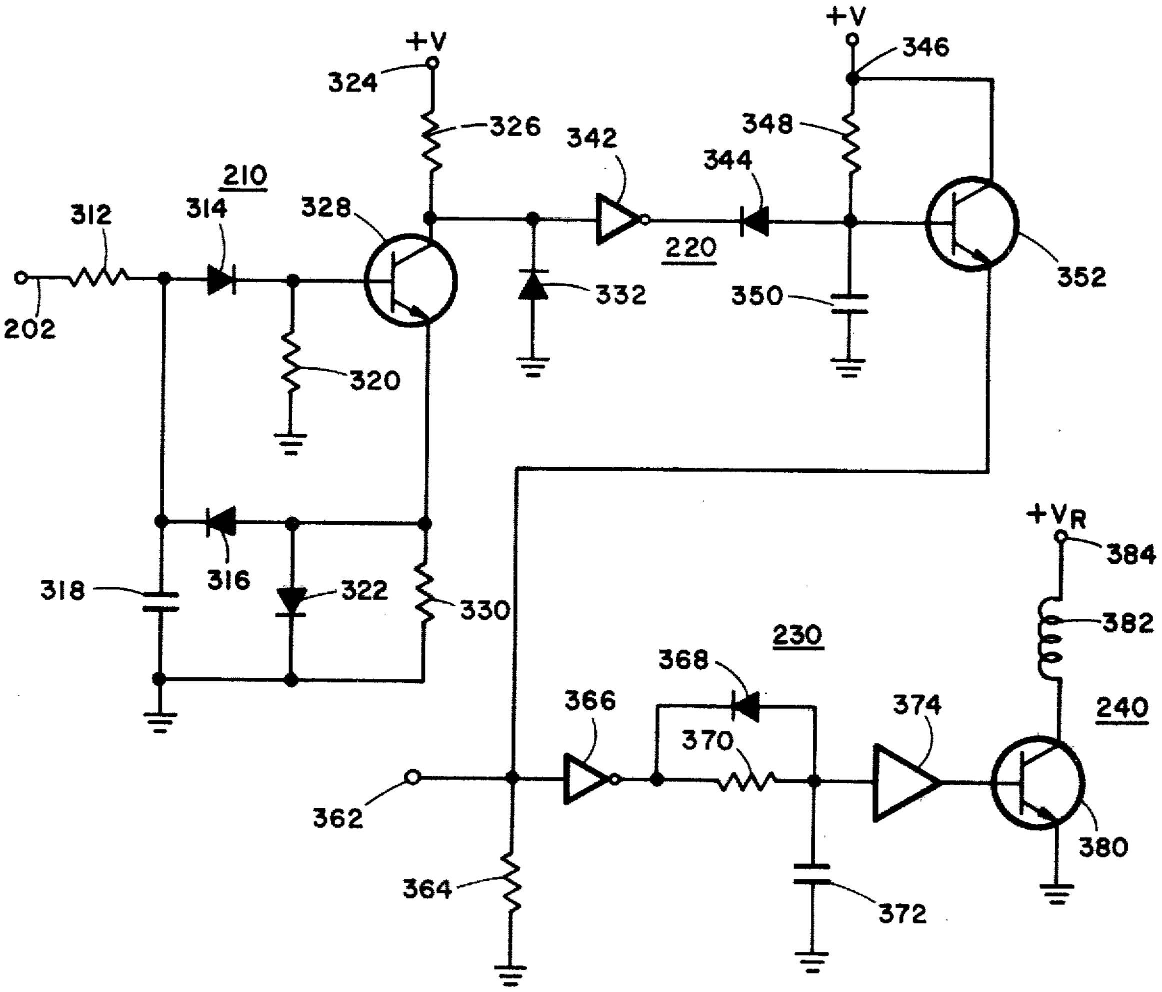
FIG. 3 is a schematic diagram of the circuit of FIG. 2.

A more detailed description of the loudspeaker protection circuit 200 shown in block form in FIG. 2 is given in FIG. 3. The output of amplifier 50 is coupled to the voltage level detector 210 via conductor 202. Coupled between conductor 202 and circuit ground is a resistor 312 in series with a capacitor 318. A diode 314, poled as shown, is coupled between the junction of resistor 312 and capacitor 318 and the base of an NPN transistor 328. The base of transistor 328 is coupled to ground via resistor 320 and the emitter of the transistor is coupled to ground via resistor 330. Coupled between the emitter of transistor 328 and the ungrounded terminal of capacitor 318 is a diode 316, poled as shown. A diode 322, poled as shown, is coupled between the emitter of transistor 328 and ground. The collector of transistor 328 is connected to one terminal of resistor 326, the other terminal of which is connected to a source of operating potential +V at terminal 324. The collector of the transistor is also coupled to ground via diode 332, poled as shown.

In operation, the amplifier output signal 10 is coupled via lead 202 to the filter formed by resistor 312 and capacitor 318. This filter reduces the slope of signals having steep edges, such as square waves, and has little effect on most input signals. The purpose of this filter will be explained subsequently. Therefore, the voltage applied to the base of transistor 328 is determined by the divider action of resistors 312 and 320 and the forward voltage drops of diode 314 and base-emitter junction of transistor 328.

The resistor 312 and 320 are chosen so that transistor 328 conducts when the waveform 10 exceeds the +2 volt threshold, as shown in FIG. 1 at point 20. When the voltage across emitter resistor 330 exceeds approximately 0.6 volts, diode 322 conducts to maintain the emitter of transistor 328 at a voltage close to zero volts. The collector resistor 326 is chosen so that transistor 328 will be in saturation at this point. Thus, the collector voltage will also be close to zero volts. Transistor 328 will remain conducting as long as the waveform 10 exceeds the threshold voltage of +2 volts. After a period of time $T_1$ (see FIG. 1) the signal 10 again crosses the +2 volt threshold as shown at point 22 in FIG. 1. When the signal 10 decreases to less than 2 volts transistor 328 will turn off and the voltage at its collector will become substantially +V.

The negative going cycle of signal 10 will back bias the diode 314 and apply a signal to the emitter resistor 330 through diode 316. The divider action of resistors 312 and 330 and the forward voltage drops of diode 316 and the base-emitter junction of transistor 328 determine the turn on point for transistor 328. Resistors 312 and 330 are chosen to provide a threshold voltage of approximately the same magnitude for the negative cycle as for the positive cycle. When the signal 10 crosses the −2 volt threshold, at point 30 in FIG. 1, base current will flow from ground through resistor 320 to turn transistor 328 on. Diode 332 will conduct to prevent the collector of transistor 328 from exceeding −0.6 volts.

The transistor 328 will remain conducting as long as the signal 10 exceeds the −2 volt threshold. After a period of time $T_2$ the signal 10 again crosses the −2 volt threshold at point 32 in FIG. 1. At this time transistor 328 turns off and the voltage at its collector will become substantially +V.

The voltage at the collector of transistor 328 is the output voltage of the voltage level detector 210. For purposes of the remainder of the discussion of the loudspeaker protection circuit it is convenient to refer to a voltage of substantially +V volts as a logic 1, and a voltage close to zero volts as a logic 0. It should be noted that for many logic circuits the logic 0 voltage must not go negative by more than a few tenths of a volt. Diode 332 is connected to the collector of transistor 328 in order to meet this requirement. It should also be noted that a range of voltages exist in which a signal voltage is classified as a logic 1 and a second non-overlapping range of voltages exists in which a signal voltage is classified as a logic 0. The magnitudes of these voltage ranges varies with the type of logic circuit chosen.

The output voltage from voltage level detector 210 is coupled to the input of inverter 342. The output of inverter 342 is the input to interval timer 220. Inverter 342 inverts the logic state applied to its input, that is, a logic 0 applied to its input will produce a logic 1 at its output and vice versa. The output of inverter 342 is coupled to the junction of a resistor 348 and a capacitor 350 by a diode 344, poled as shown. This junction point is also coupled to the base of an NPN transistor 352. The other terminal of resistor 348 and the collector of transistor 352 are coupled to a source of potential +V at point 346. The other terminal of capacitor 350 is connected to ground. The emitter of transistor 352 constitutes the output of interval timer 220 and is coupled to ground via resistor 364.

When the signal 10 is less than ±2 volts in magnitude the voltage at the input of inverter 342 will be a logic 1. Inverter 342 will generate a logic 0 at its output which will maintain capacitor 350 in a discharged state. When the signal 10 exceeds the ±2 volt threshold the output of voltage level detector 210 will be a logic 0 which will generate a logic 1 at the output of inverter 342. This will back bias diode 344 and allow capacitor 350 to charge from voltage source +V through resistor 348. Transistor 352 is connected as an emitter follower and will substantially reproduce the voltage across capacitor 350 across resistor 364. The time constant of resistor 348 and capacitor 350 and the voltage +V are chosen so that voltage across resistor 364 has reached the level to be classified as a logic 1 at the end of the chosen 50 millisecond time interval.

If the signal 10 drops below the ±2 volt level during the 50 millisecond time interval, the voltage at the input of inverter 342 will become a logic 1, and the voltage at its output will become a logic 0, which will discharge capacitor 350 through diode 344. (It should be noted that the purpose for placing a filter comprising resistor 312 and capacitor 318 across the input to voltage level detector 210 is to insure that in the presence of signals having steep edges there will be adequate time for inverter 342 to discharge capacitor 350.)

The voltage across resistor 364 is the input to the delay timer 230. This voltage is coupled to the input of an inverter 366 the output of which is coupled to one terminal of the parallel combination of resistor 370 and diode 368, poled as shown. The other terminal of this parallel combination is coupled to ground via capacitor 372 and coupled to the input of a non-inverting buffer 374. The ungrounded terminal of resistor 364 is coupled to a terminal 362. In a stereo or multi-channel amplifier system, a duplicate voltage level detector and interval timer 220 is required for each channel in the system. The output of each interval timer is coupled to terminal 362. The delay timer 230 and disconnect circuit 240 are shared by all channels in the system. However, a switch 250 or 260 will be required for each channel and each of these switches will be operated by the common disconnect circuit 240.

In operation, the presence of a logic 1 across resistor 364 will cause a logic 0 to appear at the output of inverter 366. This will discharge capacitor 372 through diode 368 and maintain the capacitor in the discharged state as long as the logic 1 is present across resistor 364. The output of non-inverting buffer 374 will also be a logic 0.

The presence of a logic 1 across resistor 364 indicates a potentially damaging condition within the system. When the condition no longer exists the voltage across resistor 364 will become a logic 0 and the voltage at the output of inverter 366 will become a logic 1. At this time capacitor 372 will charge to a logic 1 voltage through resistor 370. When capacitor 372 reaches a level sufficient to be classified as a logic 1 the output of buffer 374 will also become a logic 1. The time constant of resistor 370 and capacitor 372 is chosen so that it takes approximately 5 seconds for the voltage across resistor 372 to reach a logic 1 value.

The output of buffer 374 is coupled to the input of disconnect circuit 240 at the base of an NPN transistor 380. The emitter of transistor 380 is coupled to ground and the collector is coupled to one terminal of a relay 382. The other terminal of relay 382 is connected to a source of operating potential $+V_R$ at terminal 384. In the absence of a potentially damaging condition the output of buffer 374 will be a logic 1 causing transistor 382 to conduct thus actuating relay 382. This causes normally open switch 250 or 260 to close providing normal operation of the system. In the presence of a potential damaging condition the output of buffer 374 will become a logic 0 causing transistor 380 to turn off, thereby deactivating relay 382 and opening switch 250 or 260.

While a particular embodiment of the present invention has been disclosed herein, it will be obvious to those skilled in the art that certain changes and modifications can be made to it all included within the scope of the present invention. For example, switch 250 or 260 could be replaced by a normally closed switch and either transistor 380 replaced with a PNP transistor or buffer 374 replaced with an inverter, without departing from the present invention.

All such changes and modifications can be made without departing from the invention as defined by the appended claims.

What is claimed is:

1. A protection circuit for a loudspeaker driven by an amplifier comprising:

detector means coupled to said amplifier for generating a control signal when a signal driving said loudspeaker crosses a predetermined threshold voltage;

interval timing means coupled to said detector means for generating a disconnect signal when the time interval between selected control signals exceeds a predetermined limit; and switch means in circuit between said amplifier and said loudspeaker and coupled to said interval timing means for receiving said disconnect signal for interrupting the supply of said driving signal to said loudspeaker.

2. The circuit of claim 1 wherein said switch means disconnects said loudspeaker from the amplifier output.

3. The protection circuit of claim 1 or 2 wherein said threshold voltage is a voltage level of either positive or negative polarity.

4. The protection circuit of claim 1 wherein said predetermined limit is 50 milliseconds.

5. The protection circuit of claim 3 wherein said selected control signals are consecutive.

6. The protection circuit of claim 5 wherein said switch means restores the supply of said driving signal to said loudspeaker when said disconnect signal is no longer present; said circuit further including delay timer means for inhibiting said restoration of said driving signal for a predetermined period of time after said disconnect signal is no longer present.

7. A protection circuit for a loudspeaker driven by an amplifier comprising:

detector means coupled to said amplifier for generating a control signal when a signal driving said loudspeaker crosses a predetermined threshold voltage of either positive or negative polarity;

interval timing means coupled to said detector means for generating a disconnect signal when the time interval between consecutive control signals exceeds a predetermined limit;

delay timer means coupled to said interval timing means for receiving said disconnect signal and delaying said disconnect signal a predetermined time interval; and switch means in circuit between said amplifier and said loudspeaker and coupled to said delay timer means for receiving said delayed disconnect signal for interrupting the supply of said driving signals to said loudspeaker with said driving signals being restored to said loudspeaker following said predetermined time interval after said disconnect signal is no longer present.

8. A protection circuit for a loudspeaker driven by an amplifier energized by a power supply comprising:

detector means coupled to said amplifier for generating a control signal when a signal driving said loudspeaker crosses a predetermined threshold voltage;

interval timing means coupled to said detector means for generating a disconnect signal when the time interval between selected control signals exceeds a predetermined limit; and switch means connected between said amplifier and said power supply and coupled to said interval timing means for receiving said disconnect signal for interrupting the power provided to said amplifier thereby de-energizing said loudspeaker.

9. The protection circuit of claim 8 wherein said threshold voltage is a voltage level of either positive or negative polarity.

10. The protection circuit of claim 8 wherein said predetermined limit is 50 milliseconds.

11. The protection circuit of claim 8 wherein said selected control signals are consecutive.

12. The protection circuit of claim 8 wherein said switch means restores the supply of said power signal to said amplifier when said disconnect signal is no longer present, said circuit further including delay timer means for inhibiting said restoration of said power signal for a predetermined period of time after said disconnect signal is no longer present.

13. A protection circuit for a loudspeaker driven by an amplifier energized by a power supply comprising:

detector means coupled to said amplifier for generating a control signal when a signal driving said loudspeaker crosses a predetermined threshold voltage of either positive or negative polarity;

interval timing means coupled to said detector means for generating a disconnect signal when the time interval between consecutive control signals exceeds a predetermined limit;

delay timer means coupled to said interval timing means for receiving said disconnect signal and delaying said disconnect signal a predetermined time interval; and switch means connected between said amplifier and said power supply and coupled to said delay timer means for receiving said delayed disconnect signals for interrupting the power provided to said amplifier thereby de-energizing said loudspeaker with power being restored to said amplifier following said predetermined time interval after said disconnect signal is no longer present.

* * * * *